United States Patent
Oross et al.

(10) Patent No.: US 6,564,998 B1
(45) Date of Patent: May 20, 2003

(54) CARD ENABLED LATCH FOR A PORTABLE COMPUTER

(75) Inventors: Glen A Oross, Corvallis, OR (US); Masahiko Muranami, San Jose, CA (US)

(73) Assignee: Hewlett-Packard Development Company, Houston, TX (US)

(*) Notice: Subject to any disclaimer, the term of this patent is extended or adjusted under 35 U.S.C. 154(b) by 0 days.

(21) Appl. No.: 09/491,178

(22) Filed: Jan. 25, 2000

(51) Int. Cl.$^7$ ................................................. G06K 5/00
(52) U.S. Cl. ...................................... 235/382; 235/380
(58) Field of Search ............................... 235/379, 380, 235/382, 439, 462.01; 902/25; 705/64, 72, 35, 39, 41–44; 463/36, 37, 25, 29

(56) References Cited

U.S. PATENT DOCUMENTS

| | | | |
|---|---|---|---|
| 4,125,008 A | * 11/1978 | Genest et al. ................. 292/280 |
| 4,127,018 A | * 11/1978 | Brand | |
| 4,382,231 A | * 5/1983 | Miller | |
| 4,534,194 A | * 8/1985 | Aydin | |
| 4,644,766 A | * 2/1987 | Lovell ............................ 70/276 |
| 4,811,387 A | 3/1989 | Hollewed et al. ............. 379/144 |
| 4,931,622 A | 6/1990 | Ohtsuki et al. ............... 235/487 |
| 4,956,984 A | * 9/1990 | Chi-Cheng .................... 70/277 |
| 5,221,838 A | * 6/1993 | Gutman | |
| 5,475,378 A | 12/1995 | Kaarsoo et al. ............. 340/825.34 |
| 5,497,296 A | 3/1996 | Satou et al. ................... 361/681 |
| 5,617,474 A | 4/1997 | Ditzig et al. .................. 379/433 |
| 5,707,090 A | * 1/1998 | Sedley .......................... 292/142 |
| 5,775,142 A | 7/1998 | Kim .............................. 70/278 |
| 5,778,521 A | 7/1998 | Law et al. ..................... 29/829 |
| 5,841,868 A | * 11/1998 | Helbig, Sr. ................. 435/320.1 |
| 5,870,281 A | * 2/1999 | Kim | |
| 5,905,446 A | * 5/1999 | Benore et al. ................. 109/53 |
| 5,952,641 A | * 9/1999 | Korshun | |
| 6,108,188 A | * 8/2000 | Denison et al. | |
| 6,118,653 A | * 9/2000 | Kim | |
| 6,170,304 B1 | * 1/2001 | Ohta ............................. 70/14 |
| 6,293,464 B1 | * 9/2001 | Smalley, Jr. .................. 235/451 |
| 6,325,285 B1 | * 12/2001 | Baratelli | |

FOREIGN PATENT DOCUMENTS

| JP | 06-028539 | * 2/1994 | |
| JP | 10046887 A | * 2/1998 | ........... E05B/65/02 |

* cited by examiner

*Primary Examiner*—Diane I. Lee
(74) *Attorney, Agent, or Firm*—Timothy F. Myers (57) ABSTRACT

A portable computer has a base housing attached to a top housing. A latch secures the top housing to the base housing. The portable computer has a card reader coupled to an electro-mechanical actuator which is further coupled to the latch. The card reader is capable of disengaging the latch to allow access to the portable computer.

19 Claims, 9 Drawing Sheets

CARD ENABLED LATCH FOR A PORTABLE COMPUTER

FIELD OF THE INVENTION

The invention relates to security for a portable computer, more specifically, the invention provides security by using a latch mechanism that is unlocked using an access card.

BACKGROUND OF THE INVENTION

Portable computers have become very popular personal electronic devices and their acceptance continues to grow. Several businesses have equipped their employees with personal computers to allow them to work in remote locations and with the advent of the Internet, this trend is expected to expand. Thus, many portable computers contain sensitive personal or business related data. Several portable computers have incorporated password systems using passwords or access codes to prevent unauthorized users from accessing the sensitive data stored in the portable computer. However, often times a user will forget the password and not be able to use the portable computer. Further business executives and their information technology departments are demanding more security than just that provided by a password system. Often times, the portable computer must be accessible by more than one user. It is preferable that a single password not be shared otherwise it is easily compromised. Many professional hackers will remotely observe a user entering their password and then later steal the portable computer and thus the password protection is circumvented.

Thus, it is desired by authorized users of the portable computer that non-authorized users not be provided access to the keyboard. Authorized users also preferably wish to prevent having to enter the password on the keyboard or share it with others. Additionally, to prevent having to continually enter passwords to access several different programs or internet sites, it is preferable to have a method by which a password access code can be entered into the portable computer without having to manually enter it using a keyboard. Therefore a need exists for a new portable computer security system that can meet the demands of personal and business users.

SUMMARY

A portable computer has a base housing attached to a top housing. A latch secures the top housing to the base housing. The portable computer has a card reader coupled to an electro-mechanical actuator which is further coupled to the latch. The card reader is capable of disengaging the latch to allow access to the portable computer.

DETAILED DESCRIPTION OF THE PREFERRED AND ALTERNATE EMBODIMENTS

One aspect of the invention solves the security problem by incorporating a latch locking mechanism between a top housing and a base housing of a portable computer. The latch locking mechanism is disengaged by an electro-mechanical actuator when a card having a proper access code is read in a card reader on the portable computer. One additional aspect of the invention incorporates a password subroutine that is stored in computer readable memory in the portable computer. The card reader passes the access code read from the card reader to the password subroutine through a communication channel to allow the user to bypass having to enter the password on the portable computer before using it. Another aspect includes a barrier in the card reader to prevent the card from being fully inserted into the card reader. After the card reader determines that the card has a proper access code, the latch lock is disengaged and the barrier is removed to allow full insertion of the card for other purposes. An exemplary barrier includes a solenoid. A further aspect of the invention is to incorporate a database containing a list of one or more authorized cards and respective access codes to allow multiple users to access the portable computer. The electro-mechanical actuator is preferably a combination of electronics and mechanical linkages between the card reader and the latch. Several different methods of reading an access code from a card are envisioned. These methods include but are not limited to: barcode reading, detecting light pulses from the card, reflecting light from the card, detecting audio pulses from the card, making electrical contact with the card, and reading a magnetic strip on the card. Other aspects and features of the invention will become apparent in the following description of the preferred and alternative embodiments of the invention.

Figure 1:
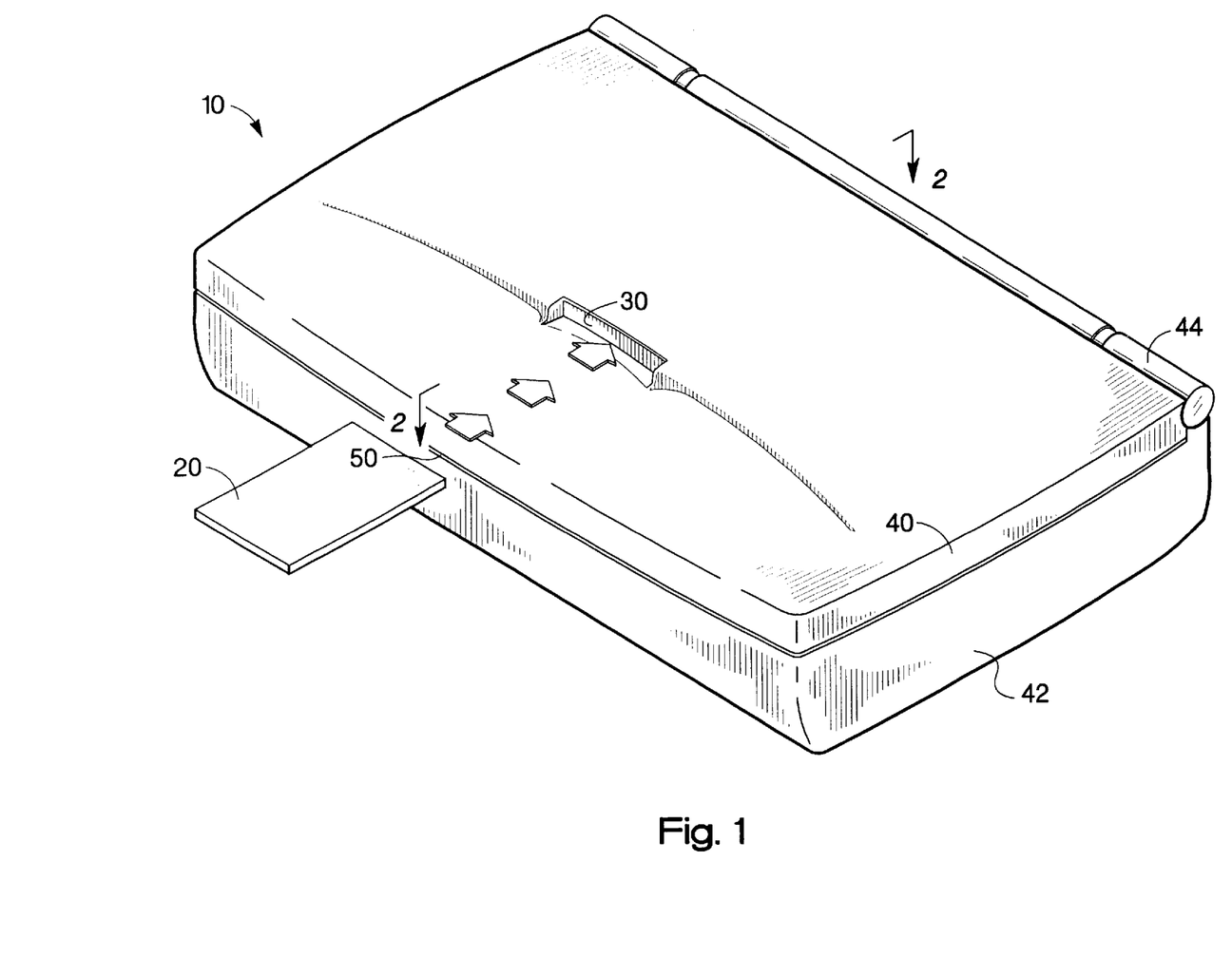
FIG. 1 is a perspective illustration of a first embodiment of a portable computer incorporating the invention.

FIG. 1 is a perspective drawing of an exemplary portable computer having a top housing 40 connected to a base housing 42 with a hinge 44. The top housing 40 is prevented from being opened by latch lock 50 (hidden from view). The top housing 40 includes a card reader 30 that accepts a card 20. Card 20 provides an access code that is read by the card reader 30. If the access code is authorized to allow access to the portable computer 10, the latch lock 50 is disengaged. The user of the portable computer 10 can then open the top housing 40 from the base housing 42 to typically access the display and keyboard.

Figure 2:
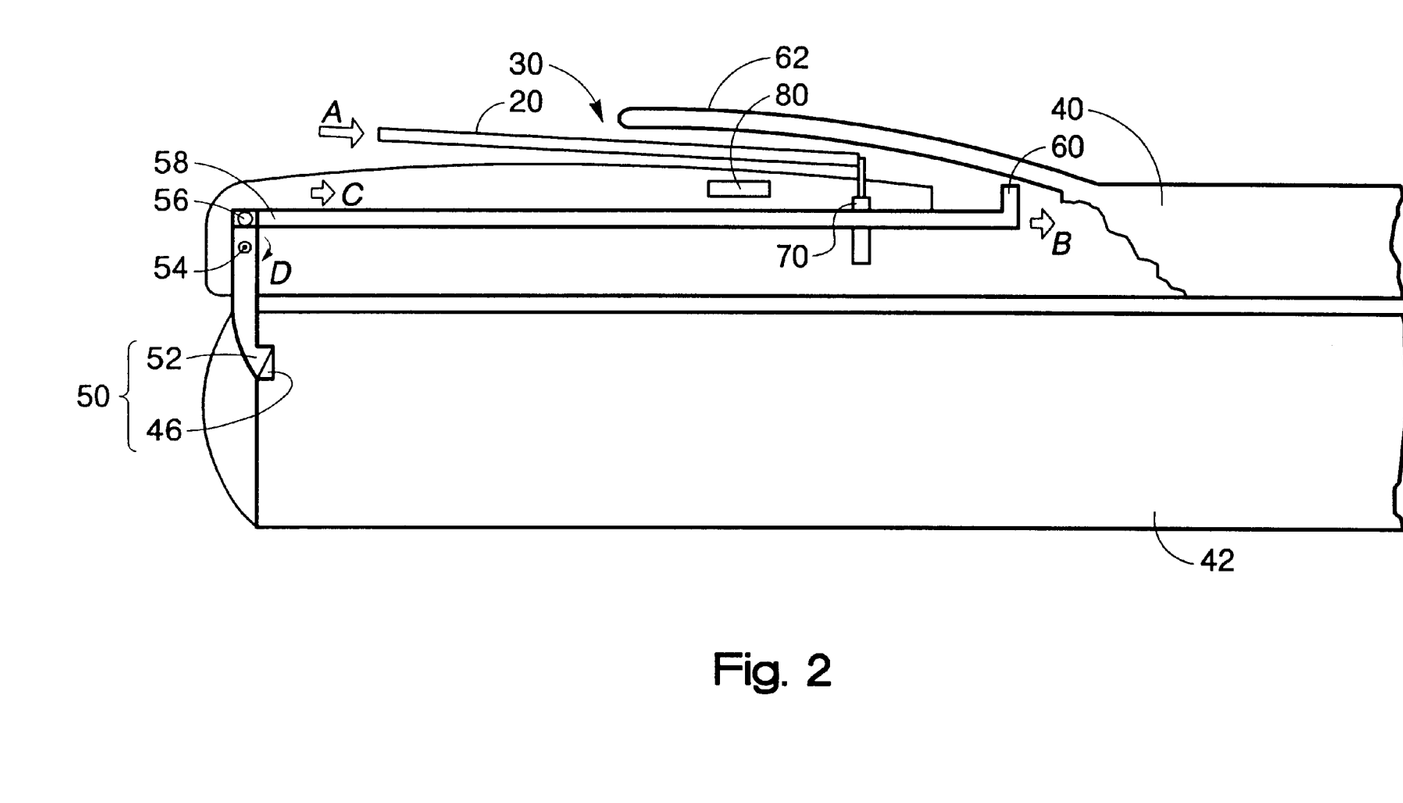
FIG. 2 is a partial cross sectional drawing of the embodiment shown in FIG. 1.

FIG. 2 is a partial cross-sectional view of the portable computer 10 through the 2—2 section shown in FIG. 1. The top housing 40 includes the card reader opening 62 that allows card 20 to be inserted in the A direction shown. As the card is inserted, a card sensor 80 is used to read the access code provided on the card 20. Optionally, a barrier 70, preferably incorporating a solenoid, is used to prevent card 20 from being fully inserted in the card reader 30. The card 20 is preferably not allowed to be fully inserted to prevent unauthorized cards from gaining access to the electronics of the portable computer. If the card 20 has a proper access code, the barrier 70 is released and the card 20 is fully inserted if it is to provide additional functions such as storage, modem, wireless communication, etc. However, card 20 may also just be used to provide secure access and then the barrier 70 is disengaged to allow other the card to release latch 50. Preferably, the card 20 is a specially designed dedicated access card to prevent possible counterfeit cards from being produced. However, optionally, the card 20 can be a standard PC card type card that has the security access code added to the card. This approach allows for a standard PC card slot to be adapted to allow for operation of latch locking mechanism.

When the card 20 is fully inserted, the card 20 contacts a card stop 60 on the end of a link arm 58. When the user pushes on the card 20 to insert it into the card reader 30, the card stop 60 moves in the direction B shown in FIG. 2. This motion causes link arm 58 to also travel in direction C as shown. The movement of the link arm 58 causes a latch hook 52 connected to link arm 58 through latch linkage 56 to rotate in the direction D shown around latch pivot 54. This rotation D causes the latch hook 52 to disengage from a latch recess 46, which is located in the base housing 42. Once disengaged, the user can separate the top housing 40 from the base housing 42.

Figure 3:
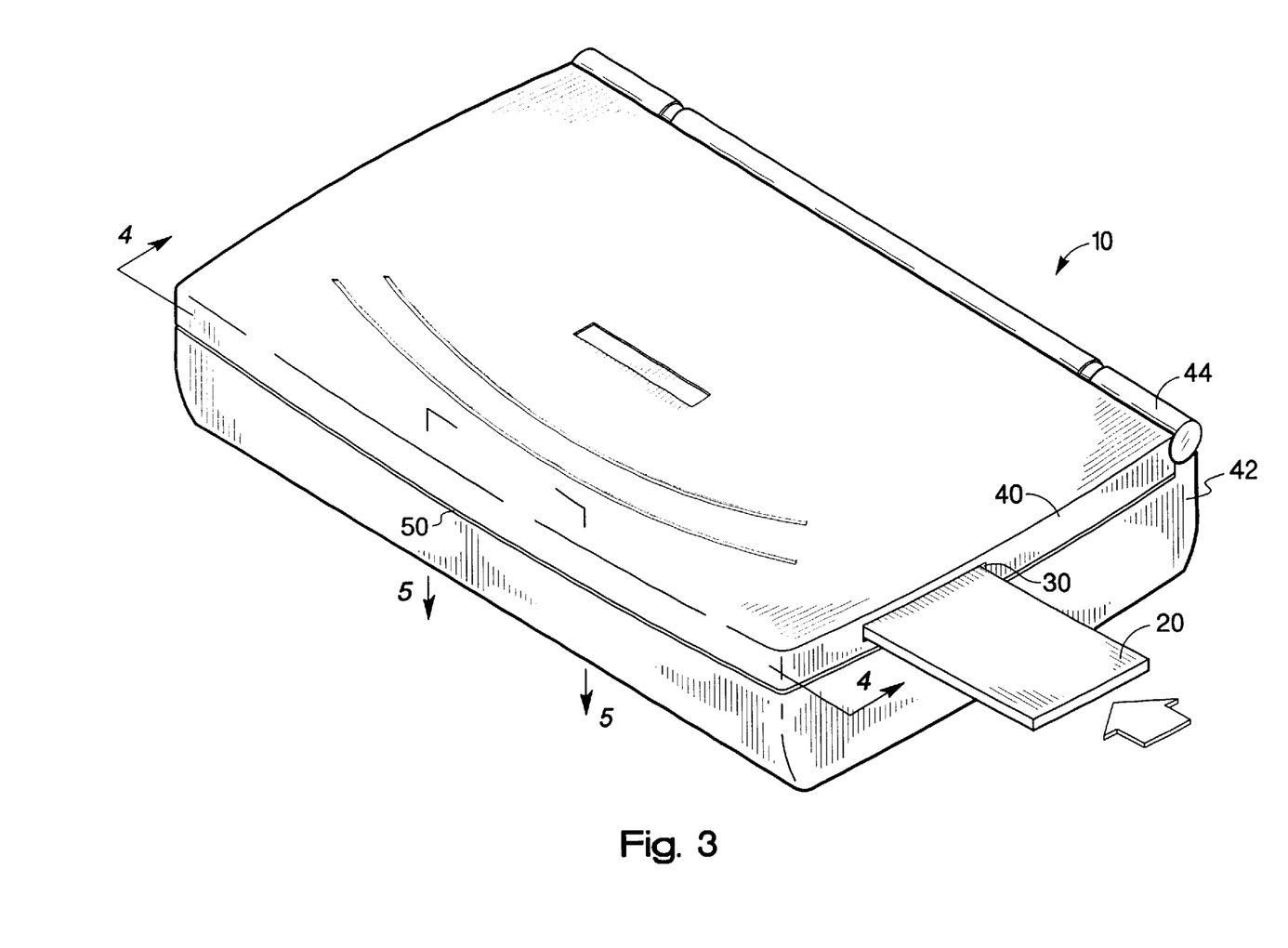
FIG. 3 is a perspective illustration of a second embodiment of the invention in a portable computer.

FIG. 3 is a perspective drawing of another exemplary portable computer 10 having an alternative side entry location for card 20 into card reader 30. Although the entry of card 20 into the card reader 30 is shown occurring in the top housing 40, it is envisioned that the card reader 30 can also reside in base housing 42 and optionally combined with a standard PC card slot (see FIG. 9).

Figure 4:
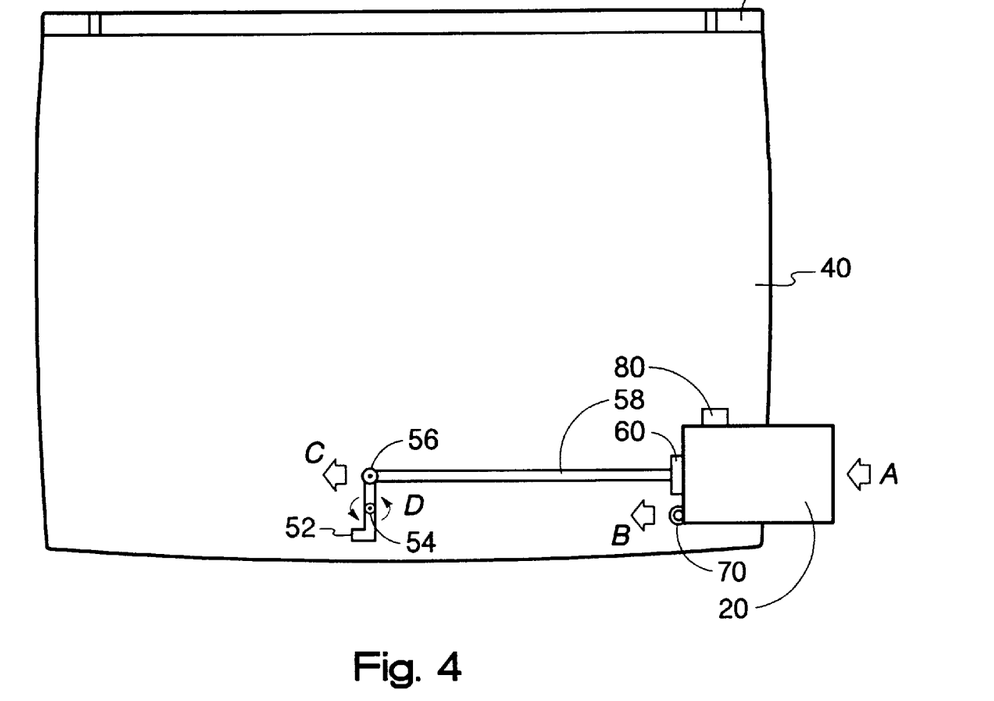
FIG. 4 is a cross sectional drawing of the embodiment in FIG. 3 showing the latch mechanism.

FIG. 4 is a first cross-sectional drawing of the latch locking mechanism in the top housing 40 through section 4—4 of FIG. 3. The section is cut through approximately the center of thickness of the top housing 40. When card 20 is inserted into the card reader 30, a card sensor 80 reads an access code from the card. Preferably, the card 20 is prevented from being fully inserted by barrier 70. If a valid access code is read, the barrier 70 is disengaged and user can fully insert card 20. When the card 20 is fully inserted, it contacts the card stop 60 and moves it in the direction B shown. The card stop 60 is connected to the link arm 58 which is further connected to a latch linkage 56. The latch linkage 56 moves in the direction C shown causing latch hook 52 to rotate in direction D around latch pivot 54.

Figure 5:
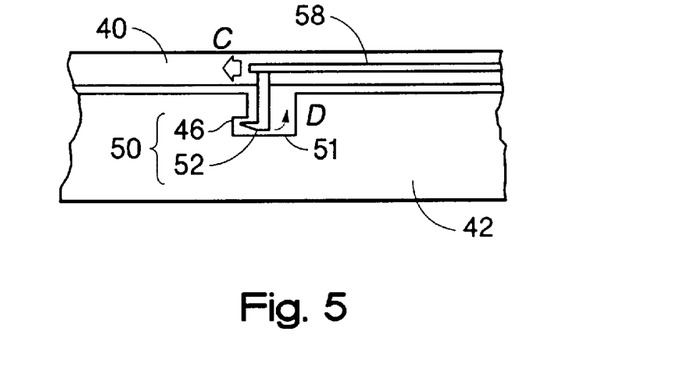
FIG. 5 is a partial cross sectional drawing of the embodiment of FIG. 3 showing the operation of the latch hook.

FIG. 5 is a partial cross sectional drawing of the latch lock through section 5—5 in FIG. 3. When the latch arm 51 rotates in direction D, the latch hook 52 is disengaged from the latch recess 46 allowing the user of the portable computer access to the screen and keyboard. Latch 50 includes latch hook 52 and latch recess 46.

Figure 6:
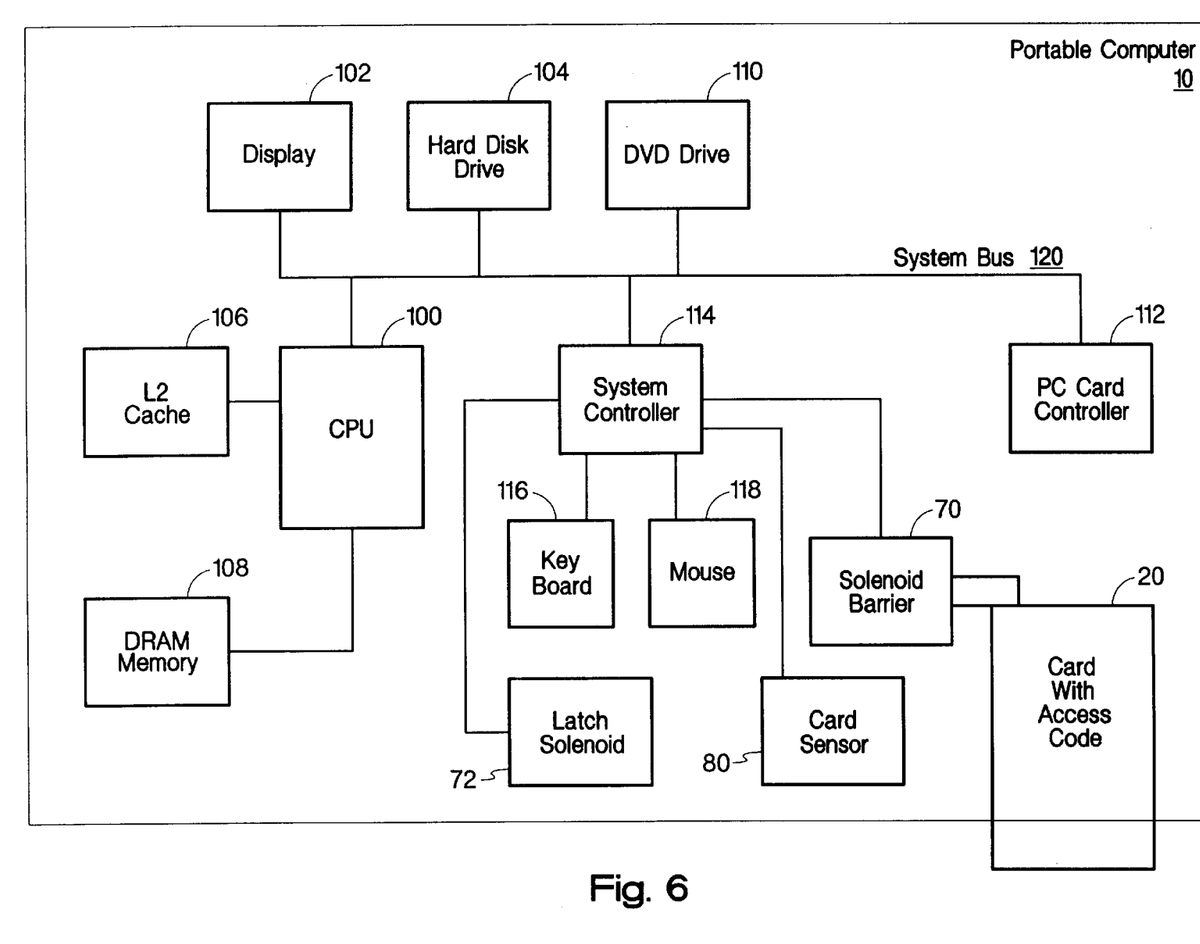
FIG. 6 is an exemplary block diagram of a portable computer shown in the embodiments.

FIG. 6 is an exemplary block diagram of a portable computer incorporating an exemplary embodiment of the invention. When card 20 is inserted into the portable computer, it is prevented from connecting to a PC card controller 112 by a barrier 70, preferably a solenoid. During insertion or after the card has been inserted, a card sensor 80 reads at least one access code off of the card 20. The electro-mechanical actuator to release the latch 50 is controlled by a system controller 114, typically the keyboard controller IC in a portable computer. The system controller 114 is able to read the card sensor circuitry and accordingly determine that the barrier 70 is engaged or disengaged. Preferably, the card 20 disengages the latch 50 using a mechanical linkage as shown in FIGS. 1–5. Optionally, it is envisioned that a latch solenoid 72 is controlled by the system controller 114 to engage and disengage the latch 50 (See FIGS. 9–11). The system controller also typically controls the keyboard 116 and mouse 118 and includes computer readable memory for executing instructions.

The system controller 114 and PC card controller 112 are coupled through a system bus 120, for example PCI, to a central processing unit (CPU) 100, such as a Pentium Processor from Intel. The CPU is connected to computer readable memory such as L2 cache 106 and DRAM memory 108. Other typical devices coupled to the system bus include a display 102 usually located in the top housing 40 and mass storage devices such as hard disk drive 104 and DVD drive 110 usually located in the base housing 42.

Figure 7:
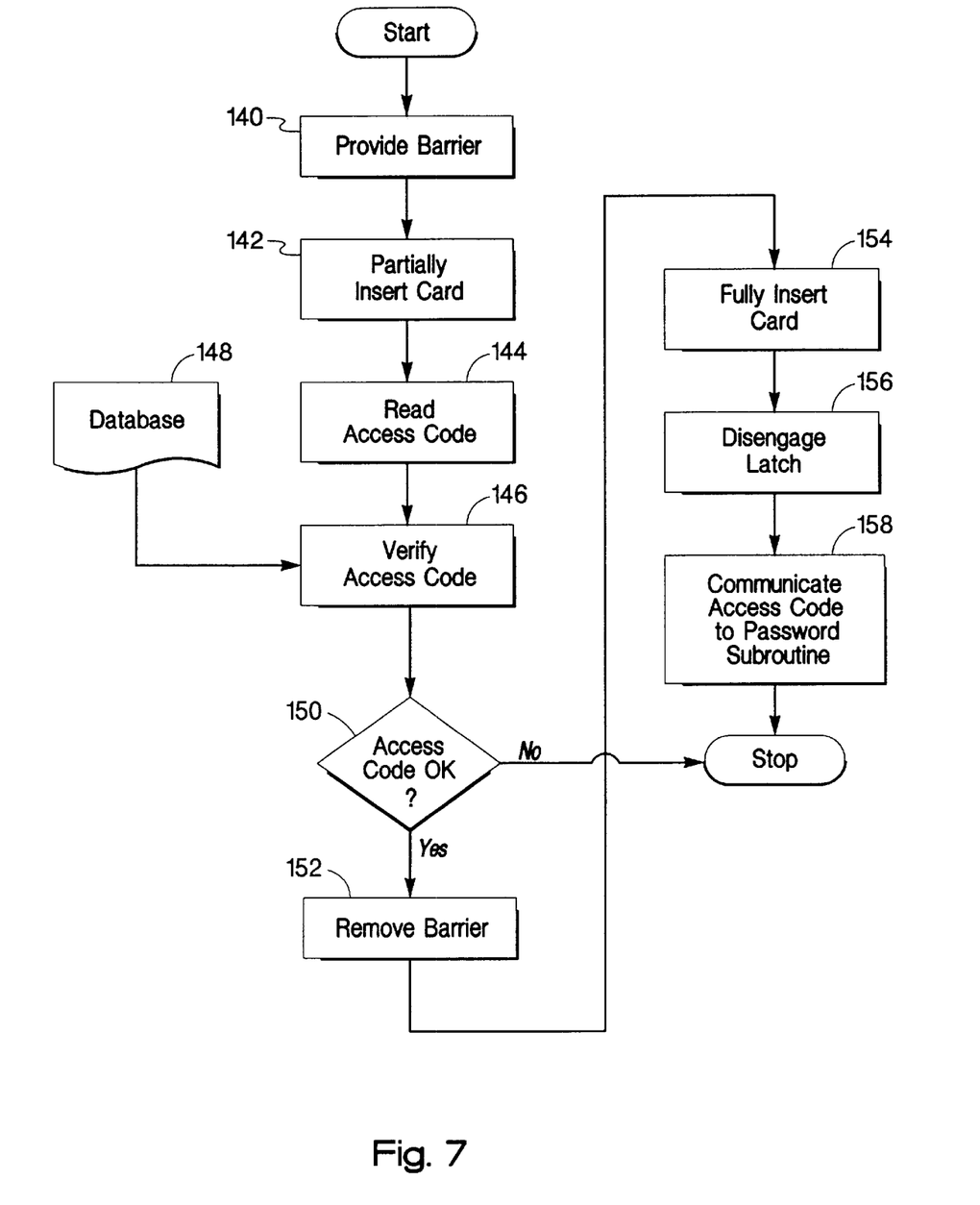
FIG. 7 is a flowchart of an exemplary process to use a card to open the display latch of the portable computer of FIGS. 1 and 3.

FIG. 7 is an exemplary flowchart of a method for providing secure access to a portable computer using the described embodiments. Preferably, this method is implemented in a software subroutine in computer readable memory in either the system controller or optionally the computer readable memory connected to CPU 100. However, the method can also be encoded fully or partially in fixed or programmable logic circuitry.

In block 140 an optional barrier is provided or engaged to prevent the PC card from being fully inserted into the card reader. The card is then partially inserted into the card reader in block 142 to allow an access code to be read from the card in block 14. Preferably, no more than 75% of the card is partially inserted. Next in block 146, the access code read is verified, preferably by searching for it in a database 148 containing one or more permissible access codes or passwords. If the access code is not verified, the routine is exited to prevent the latch from being disengaged. If the access code is verified in block 150, the barrier is removed in block 152. The card is then fully inserted by the user in block 154. Preferably the card either engages a mechanical linkage coupled to the latch or the latch is activated by a solenoid by the system controller to disengage the latch in block 156. Preferably, but optionally, in block 158, the access code is passed through a communication channel to a password subroutine to allow the user to not have to manually enter a password on the keyboard. The password subroutine is typically found in the system controller computer readable memory for a BIOS password. The password subroutine is typically found in the CPU readable memory for an operating system password or Internet access password.

FIGS. 8A through 8F illustrate several embodiments 21–26 of card 20 for reading an access code. Preferably, the access code is read from the card 20 when it is only partially inserted. For a typical PC card, this means that electrical contact to the connector 188 is not engaged. Therefore, it is preferable to have a non-contact method to read the access code from the card 20. However, additional contacts can be placed on the card to allow for access to electrical circuits.

Figure 8A:
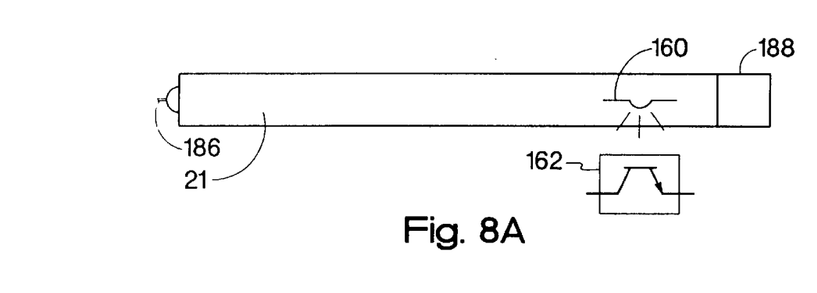
FIGS. 8A–F are exemplary embodiments of cards that communicate an access code to release the display latch locks in FIGS. 1 and 3.

FIG. 8A is an illustration of a first exemplary card 21 having an LED 160 that emits light pulses to a photodetector 162 in the card sensor 80. To enable the LED light pulses, it is preferable that the user press a switch 186 on the card to send a burst of light pulses upon which is encoded the access code. The light pulses are converted to electrical signals by the photo-detector 162.

Figure 8B:
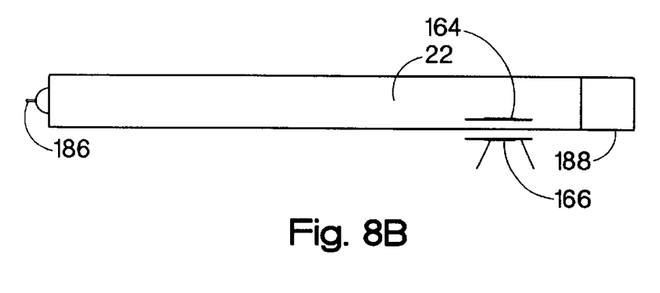

FIG. 8B is an illustration of a second exemplary card 22 which uses audio pulses to encode the access code. The audio pulses can be either in the human sound range or preferably in the ultra-sonic range to prevent detection by humans. A first piezo electric transducer 164 is included in the card and activated by the user preferably pressing a switch 186 on the card. A second piezo-electric transducer 166 is located in the card sensor to sense the first piezoelectric's pulses and convert them to electrical signals. One advantage of this embodiment is that the thinness of the piezo transducer allows it to be placed next to the shell case of the card. This mechanical arraignment allows many existing cards to be retrofitted with an access code sending unit. Another advantage is that the energy required to transmit the access code is much smaller than with the LED approach in FIG. 8A. Another advantage over the LED approach is that the alignment of the card to the card sensor is less critical.

Figure 8C:
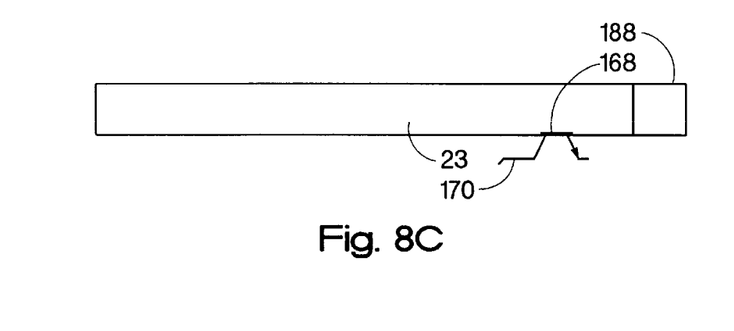

FIG. 8C is an illustration of a third exemplary card 23 which includes additional electrical contacts 168 on the card surface other than the connector 188 electrical contacts such as found on a conventional PC Card or Cardbus peripheral card. When the card is inserted to a predetermined distance, preferably determined by the barrier, spring contacts 170 connect to the additional electrical contacts 168 on card 23 to allow the access code to be read by the card reader and its card sensor. This approach has the advantage of not requiring a user to press a button on the card 23 to transmit the access code as it can be read as soon as a proper connection is made.

Figure 8D:
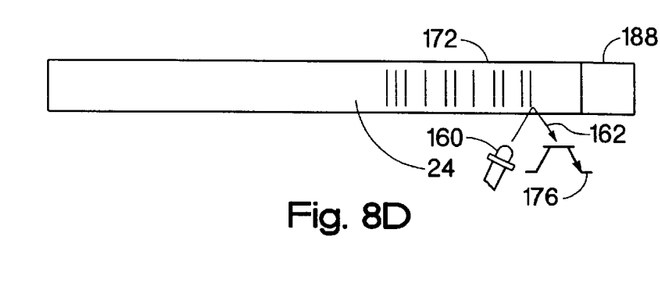

FIG. 8D is an illustration of a fourth exemplary card 24 in which a bar code 172 is either labeled or imprinted on the card. The bar code 172 is place on any surface that is readable by the card sensor when the card is partially inserted. In this embodiment, a card sensor includes an LED 160 that emits a focused light onto barcode 172 as the card is being inserted. The light from LED 160 is reflected off the bar code 172 onto a photodetector 162 which converts the reflected light to an electrical signal. One concern with the bar code approach is that the bar code may be visible to unauthorized users and copied. Preferably, the bar code 172 is printed in non-visible ink which is non-readable by humans but readable by the card sensor.

Figure 8E:
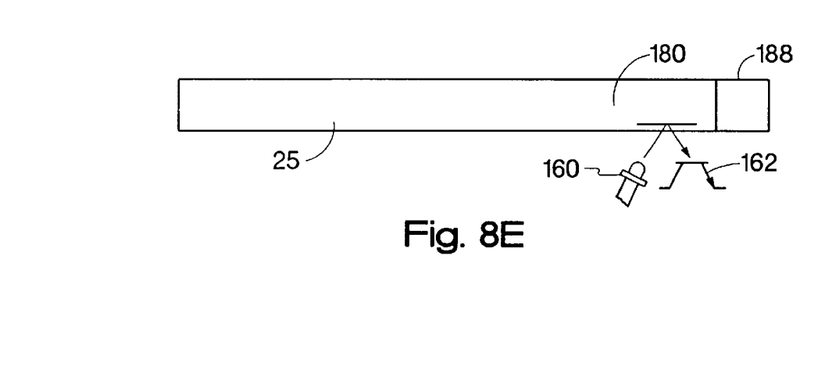

FIG. 8E is an illustration of a fifth exemplary card 25 which contains an LCD pixel element 180. The LCD pixel element 180 can be constantly activated as it requires little energy. The LCD pixel element 180 is modulated to continuously transmit the access code. The card sensor contains an LED 60 which preferably sends a continuous light signal when the card is to be read. The continuous light signal is modulated by the LCD pixel element 180 such that the light received by photo detector 162 is converted to an electrical signal that contains the access code.

Figure 8F:
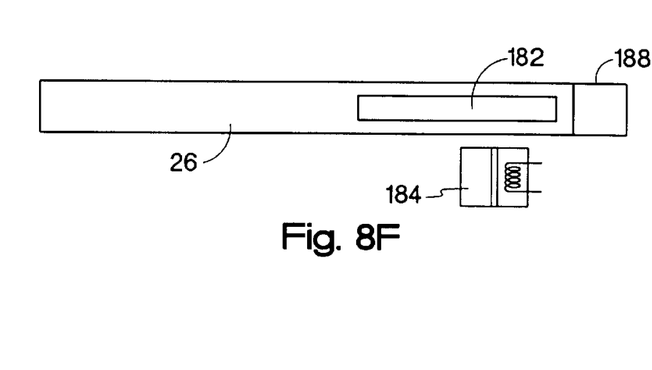

FIG. 8F is an illustration of a sixth exemplary card 26 having a magnetic strip 182 deposited on the surface of the card and pre-written with at least one access code. As the card 26 is inserted into the card reader, the card sensor reads the access code from the magnetic strip with a magnetic head 184.

Figure 9:
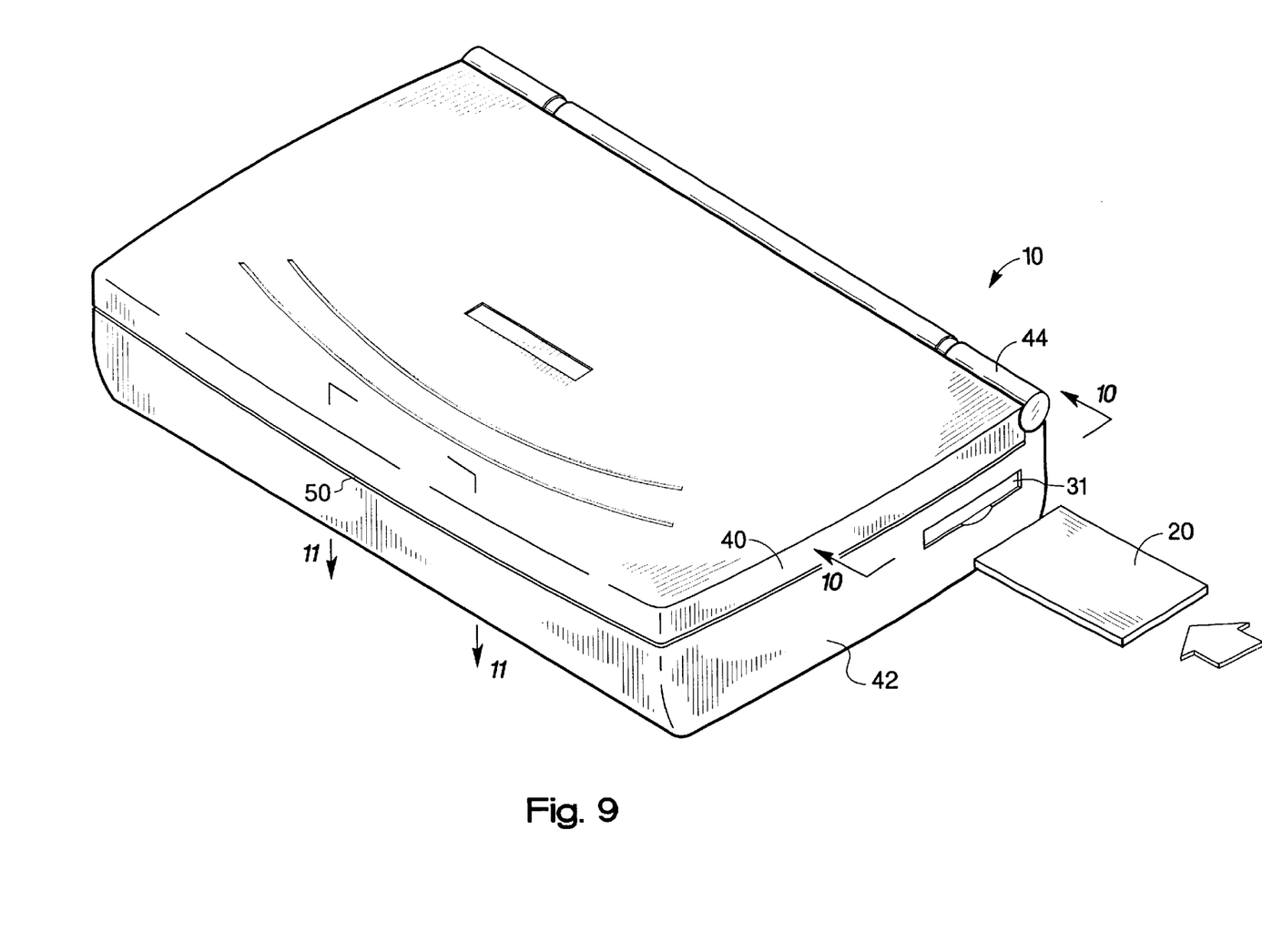
FIG. 9 is a perspective drawing of a third embodiment of the invention which modifies an existing PC Card slot.

FIG. 9 is a perspective drawing illustrating a third embodiment of the invention which adapts a conventional PC card or Cardbus slot to perform the access card reader function. A portable computer 10 has a top housing 40 and a bottom housing 42 attached through a hinge 44. The top housing 40 and bottom housing 42 are prevented from being opened by unauthorized users by a latch 50 that locks the two housing together. To disengage the latch 50, a user inserts a card 20 which incorporates an access code into the PC card slot 31. The PC card slot 31 may be either a Type I, Type II, or Type III conventional PC card slot. Preferably, the access card 20 is not a standard PC Card in order to prevent unauthorized duplication by non-authorized users. Optionally, the access card 20 includes PC card functionality.

Figure 10:
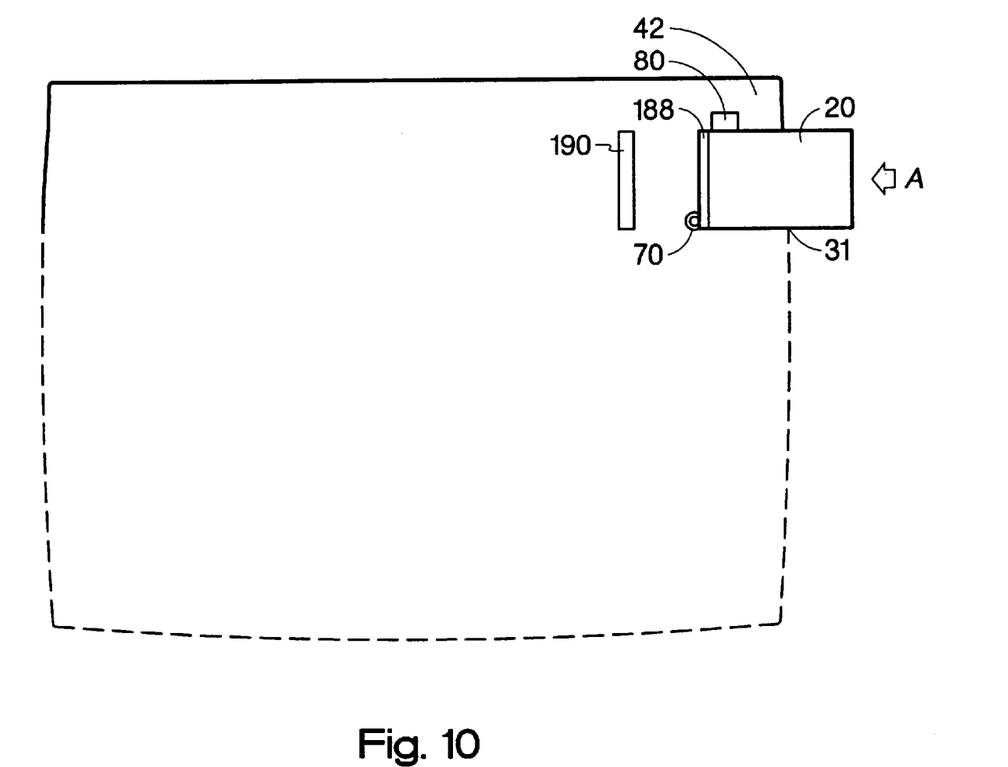
FIG. 10 is a partial cross sectional drawing of the embodiment of FIG. 9 illustrating exemplary modifications to the PC Card slot.

FIG. 10 is a partial cross-sectional drawing along section 10—10 of FIG. 9 illustrating modifications to the PC Card slot 31 in base housing 42 to allow the access code to be read from card 20. When the user inserts card 20 along direction A into PC Card slot 31, it preferably is prevented from being fully inserted by a barrier 70, which preferably includes a solenoid or other electro-mechanical component such as a voice coil or electrostrictive plastic to name a couple. A card sensor 80 reads the access code from the card. The card sensor 80 is preferably coupled to a system controller which is further coupled to a latch solenoid 72 (see FIG. 11) which controls the latch 50. If the card 20 contains a valid access code, the barrier 70 is disengaged. If the card 20 has a PC Card connector 188, the card 20 is fully inserted by the user into the PC card slot 31 until the connector 188 is engaged with PC Card mating connector 190.

Figure 11:
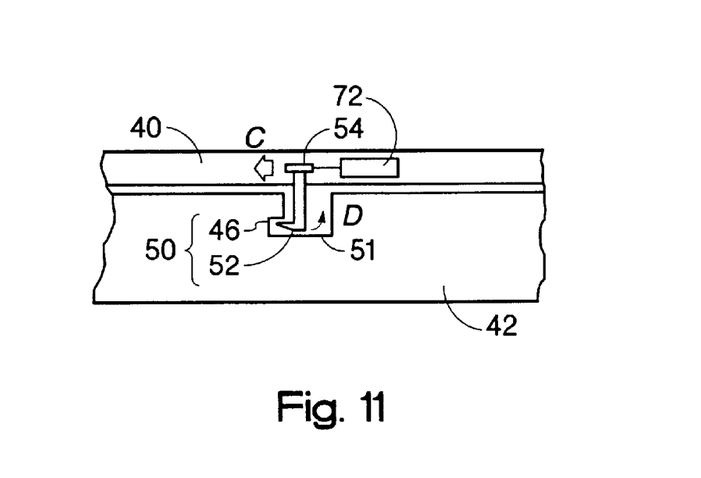
FIG. 11 is a partial cross sectional drawing of the embodiment of FIG. 9 illustrating an exemplary latch locking mechanism using a solenoid for activation.

FIG. 11 is a partial cross-sectional drawing of the top housing 40 and bottom housing 42 of the embodiment shown in FIG. 9 through section 11—11. The top housing 40 includes the latch solenoid 72 which is coupled to a latch mechanism. This exemplary latch works similar to the latch mechanism of FIG. 4 only instead of the card 20 urging the latch pivot 54 (see FIG. 4) the second solenoid 72 provides the urging in direction C. When the latch pivot 54 is urged in direction C the latch hook 52 on latch arm 51 is rotated in direction D away from latch recess 46. Once the latch hook 52 is clear of the latch recess 46, the user is able to access the display and keyboard of the portable computer 10.

Although several different embodiments have been shown and explained, several modifications could be made and still fall within the spirit and scope of the invention. The invention is only limited by the following claims.

What is claimed is:

1. A method of providing secure access to a portable computer, the method comprising the steps of:
   providing a barrier to prevent full insertion of a card into a card reader;
   partially inserting the card into the card reader;
   reading an access code from the card;
   verifying that the access code matches an access code entry from a database;
   if verified, removing the barrier;
   fully inserting the card into the card reader; and
   disengaging a latch that prevents a top housing and a base housing of the portable computer from opening.

2. A portable computer, comprising:
   a base housing;
   a top housing, attached to said base housing;
   a latch for securing said top housing to said base housing;
   a card reader;
   an electro-mechanical actuator coupling said card reader and said latch wherein said card reader is capable of disengaging said latch thereby allowing access to said portable computer;
   a barrier that prevents full insertion of a card into said card reader before said card reader verifies that said card is authorized to disengage said latch, and wherein said barrier is removed when said card reader verifies that said card is authorized.

3. The portable computer of claim 2, further comprising:

computer readable memory in said base housing;

a password subroutine operating in said computer readable memory; and a communication channel between said card reader and said password subroutine wherein said card reader transfers an access code from a card inserted in said card reader to said password subroutine.

4. The portable computer of claim 2 wherein said barrier is formed using a solenoid.

5. The portable computer of claim 2 wherein said electromechanical actuator includes a database containing a list of authorized cards capable of disengaging said latch.

6. The portable computer of claim 2 wherein said electromechanical actuator is activated by a card being inserted into said card reader.

7. The portable computer of claim 2 wherein said electromechanical actuator includes a mechanical linkage between said card reader and said latch wherein the full insertion of a card caused said mechanical linkage to disengage said latch.

8. The portable computer of claim 2 wherein said electromechanical actuator includes a latch solenoid between said card reader and said latch wherein said card reader activates said latch solenoid to disengage said latch.

9. The portable computer of claim 2 wherein said card reader is capable of reading a barcode imprinted on said card.

10. The portable computer of claim 2 wherein said card reader is capable of detecting light pulses from said card.

11. The portable computer of claim 2 wherein said card reader is capable of detecting audio pulses from said card.

12. A method of providing secure access to a portable computer, the method comprising the steps of:

partially inserting a card into a card reader;

reading an access code from the card;

fully inserting the card into the card reader;

disengaging a latch that prevents a top housing and a base housing of the portable computer from opening by mechanically moving said latch using a force exerted on the card when the card is fully inserted into said card reader; and verifying that the access code matches an access code entry from a database before allowing the step of disengaging said latch.

13. The method of claim 12 herein the step of disengaging the latch further comprises the step of mechanically moving said latch with a latch solenoid controlled by said card reader.

14. The method of claim 12, further comprising the steps of:

providing a barrier to prevent the full insertion of the card in said card reader; and if the access code matches an access code entry, removing said barrier.

15. The method of claim 14 wherein the steps of providing and removing said barrier further comprises the steps of activating and deactivating a solenoid.

16. The method of claim 12 wherein the step of verifying the access code of the card includes the step of:

reading a bar code label on the card.

17. The method of claim 12 wherein the step of verifying the access code of the card includes the step of:

detecting a sequence of light energy pulses from the card.

18. The method of claim 12 wherein the step of verifying the access code of the card includes the step of:

detecting a sequence of sound energy pulses from the card.

19. The method of claim 12 further comprising the step of:

communicating said access code to a password subroutine in said portable computer.

* * * * *